US011329857B2

(12) United States Patent
Tsai et al.

(10) Patent No.: US 11,329,857 B2
(45) Date of Patent: May 10, 2022

(54) CELLULAR NETWORK

(71) Applicant: NANYA TECHNOLOGY CORPORATION, New Taipei (TW)

(72) Inventors: Feng-Ju Tsai, Hsinchu County (TW); Shyue-Ru Doong, Taipei (TW)

(73) Assignee: NANYA TECHNOLOGIES CORPORATION, New Taipei (TW)

( * ) Notice: Subject to any disclaimer, the term of this patent is extended or adjusted under 35 U.S.C. 154(b) by 0 days.

(21) Appl. No.: 16/867,542

(22) Filed: May 5, 2020

(65) Prior Publication Data
US 2021/0351969 A1 Nov. 11, 2021

(51) Int. Cl.
H04W 4/00 (2018.01)
H04L 27/26 (2006.01)
H04W 88/12 (2009.01)
H04W 64/00 (2009.01)
H04W 88/08 (2009.01)
H04W 92/20 (2009.01)

(52) U.S. Cl.
CPC ....... *H04L 27/2689* (2013.01); *H04W 64/003* (2013.01); *H04W 88/08* (2013.01); *H04W 88/12* (2013.01); *H04W 92/20* (2013.01)

(58) Field of Classification Search
CPC  H04L 27/2689; H04W 64/003; H04W 88/08; H04W 88/12
See application file for complete search history.

(56) References Cited

U.S. PATENT DOCUMENTS

| 10,178,449 | B1* | 1/2019 | Struhsaker | H04Q 9/00 |
| 2010/0260169 | A1* | 10/2010 | Gheorghiu | H04W 56/0015 370/350 |
| 2012/0100884 | A1 | 4/2012 | Radulescu | |
| 2013/0009753 | A1* | 1/2013 | Nakaya | G01D 18/00 340/10.1 |
| 2013/0252672 | A1 | 9/2013 | Gavrilovich | |
| 2015/0277503 | A1* | 10/2015 | Eremenko | G06F 1/1658 361/679.4 |
| 2016/0143028 | A1* | 5/2016 | Mancuso | H04W 12/08 370/338 |
| 2017/0078063 | A1* | 3/2017 | Gerszberg | H04L 5/0048 |
| 2017/0086199 | A1* | 3/2017 | Zhang | H04W 64/00 |
| 2018/0376399 | A1* | 12/2018 | Zhou | H04W 36/32 |
| 2019/0288397 | A1 | 9/2019 | Lucent | |
| 2020/0064483 | A1* | 2/2020 | Li | G01S 17/87 |
| 2020/0072984 | A1* | 3/2020 | Hassan | H04W 4/90 |
| 2020/0091608 | A1* | 3/2020 | Alpman | H01Q 5/47 |

FOREIGN PATENT DOCUMENTS

| CN | 101776750 A | 7/2010 |
| TW | M564279 U | 7/2018 |

* cited by examiner

*Primary Examiner* — Erika A Washington
(74) *Attorney, Agent, or Firm* — CKC & Partners Co., LLC

(57) ABSTRACT

A cellular network includes multiple miniature base stations. The miniature base stations are communicatively connected to each other. Each one of the miniature base stations includes an antenna, a wireless signal transceiver and a digital signal processor. The antenna is arranged at a peripheral area of the miniature base stations and configured to receive and to transmit wireless signals. The wireless signal transceiver is configured to demodulate the wireless signals received from the antenna and to modulate the wireless signals transmitted by the antenna. The digital signal processor is configured to process the wireless signals, which are demodulated or modulated.

5 Claims, 3 Drawing Sheets

CELLULAR NETWORK

BACKGROUND

Technical Field

The disclosure relates to a cellular network, particularly to a cellular network for increasing density of the base stations.

Description of Related Art

With development of technology, the total amount of data that needs to be transmitted is increasing and the demand for information transmission becomes faster and faster.

Therefore, how to improve a cellular network to meet such data transmission demand is an important issue in this field.

SUMMARY

One aspect of the present disclosure is a cellular network including multiple miniature base stations. The miniature base stations are communicatively connected to each other. Each one of the miniature base stations includes an antenna, a wireless signal transceiver and a digital signal processor. The antenna is arranged at a peripheral area of the miniature base stations and configured to receive and to transmit wireless signals. The wireless signal transceiver is configured to demodulate the wireless signals received from the antenna and to modulate the wireless signals transmitted by the antenna. The digital signal processor is configured to process the wireless signals, which are demodulated or modulated.

In summary, in various embodiments of the present disclosure, by reducing the size of the antenna to be suitable for high frequency and short wavelength transmission bands, more antennas can be installed in the miniature base stations, which can achieve the effect of multiple input multiple output (MIMO). And due to the small size of the antennas and miniature base stations, they can be installed in many different locations, such as vehicles, traffic poles, trash cans, and mobile phones, so as to increase the density of the base stations of the cellular network, so that the data transmission can be faster and larger.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In this document, the term "coupled" may also be termed "electrically coupled," and the term "connected" may be termed "electrically connected." "Coupled" and "connected" may also be used to indicate that two or more elements cooperate or interact with each other. In the following description and in the claims, the terms "include" and "comprise" are used in an open-ended fashion, and thus should be interpreted to mean "include, but not limited to." As used herein, the term "and/or" includes any and all combinations of one or more of the associated listed items.

Figure 1:
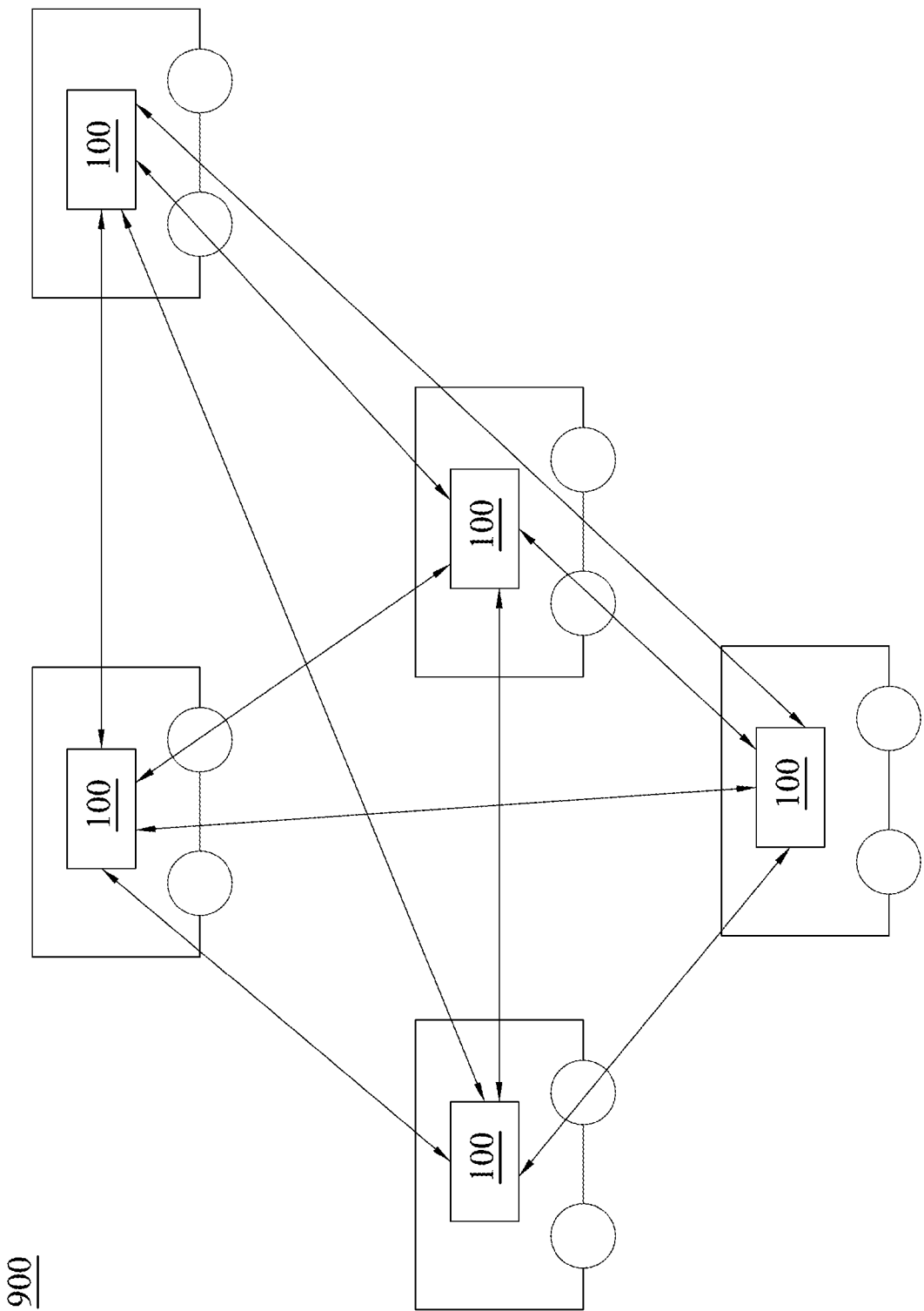
FIG. 1 is a schematic diagram illustrating a cellular network in accordance with some embodiments of the disclosure.

Please refer to FIG. 1. FIG. 1 is a schematic diagram illustrating a cellular network 900 in accordance with some embodiments of the disclosure. As shown in FIG. 1, the cellular network 900 includes multiple miniature base stations 100. The miniature base stations 100 are communicatively connected to each other. The signal coverage range of the miniature base stations 100 are 5 km to 10 km.

In the embodiment of FIG. 1, the miniature base stations 100 are arranged at electric vehicles. In some other embodiments, the miniature base stations 100 may be arranged at electric scooters, taxis, buses, trains, traffic lights, road signs, streetlights, trash bins or mobile phones.

It should be noted that the above positions at which the miniature base stations 100 arranged are merely examples, and not intended to limit the present disclosure. Those of ordinary skills in art may design and adjust based on actual requirements. For example, the miniature base stations 100 may arranged at trees or potted plants, and solar panels, photoelectric converters and/or batteries need to be installed.

Figure 2:
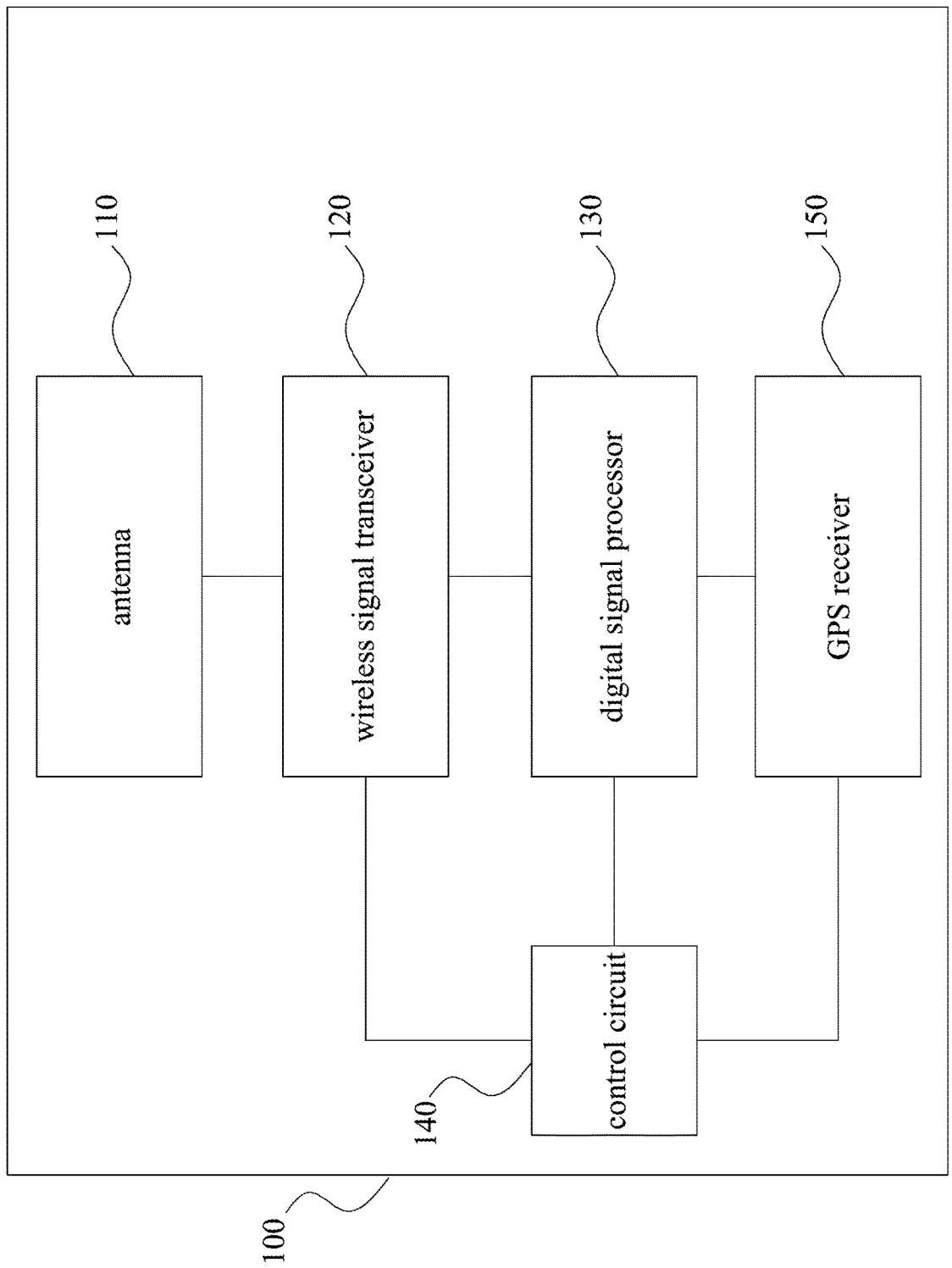
FIG. 2 is a schematic diagram illustrating a miniature base station in accordance with some embodiments of the disclosure.

FIG. 2 is a schematic diagram illustrating a miniature base station 100 in accordance with some embodiments of the disclosure. As shown in FIG. 2, the miniature base station 100 includes an antenna 110, a wireless signal transceiver 120, a digital signal processor 130, a control circuit 140 and a GPS receiver 150.

In structure, the antenna 110 is coupled to the wireless signal transceiver 120. The digital signal processor 130 is coupled to the wireless signal transceiver 120 and the GPS receiver 150. The control circuit 140 is coupled to the wireless signal transceiver 120, the digital signal processor 130 and the GPS receiver 150.

In configurationally, the antenna 110 is configured to receive and to transmit wireless signals. The wireless signal transceiver 120 is configured to demodulate the wireless signals received from the antenna and to modulate the wireless signals transmitted by the antenna 110. The digital signal processor 130 is configured to process the wireless signals, which are demodulated or modulated by the wireless signal transceiver 120. The GPS receiver 150 is configured to receive a GPS signal and to transmit the GPS signal to the control circuit 140 and/or the digital signal processor 130. The control circuit 140 is configured to control the wireless signal transceiver 120, the digital signal processor 130 and the GPS receiver 150.

Figure 3:
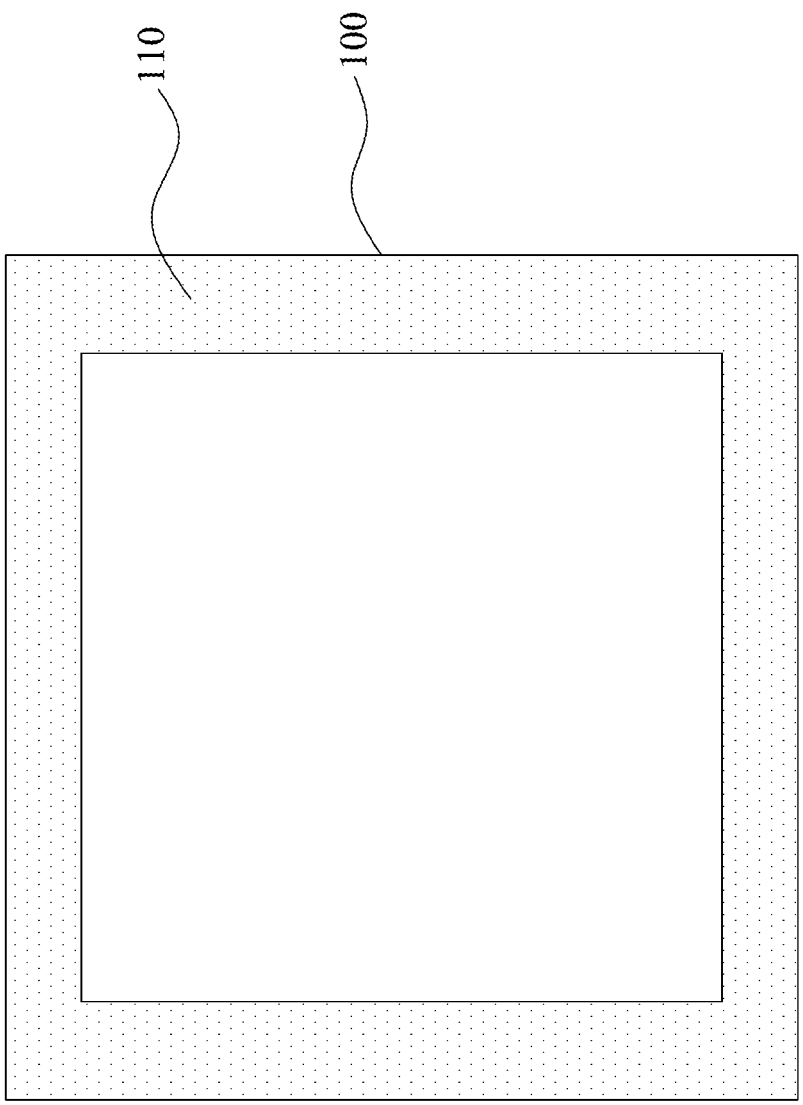
FIG. 3 is a schematic diagram illustrating an antenna configuration in the miniature base station in accordance with some embodiments of the disclosure.

FIG. 3 is a schematic diagram illustrating an antenna 110 arranged in the miniature base station 100 in accordance with some embodiments of the disclosure. As shown in FIG. 3, the antenna 110 is arranged at a peripheral area of the miniature base stations 100. In some embodiments, the antenna is suitable for the millimeter wave band of frequency from 30 GHz to 300 GHz and wavelength from 1 mm to 10 mm, such as 5G. Since the frequency of the millimeter wave band is high and the wavelength of the millimeter wave band is short, the antenna suitable for millimeter wave band is shortened. For example, the size of the antenna 110 is within ten centimeters square.

In this way, with the smaller size of the antenna 110, more antennas 110 can be installed in the same volume, which increases the transmission channel capacity with the base station and can achieve the effect of multiple input multiple output (MIMO). Or the miniature base station 100 containing the antenna 110 can be reduced to a smaller size, so that more miniature base stations 100 can be easily installed to various positions.

In other words, more objects or devices containing the miniature base station 100, higher the density of the base stations of the cellular network 900, and faster and larger the data transmission. For example, in cities, the miniature base station 100 may be constructed in buildings or streetlights. In suburbs, the miniature base station 100 may be constructed on trees or plants and has solar charging function and GPS positioning function, so that the miniature base station 100 can be confirmed whether the function is normal through the remote control. And in this way, the signals in suburbs or mountains can be improved.

On the other hand, by installing the miniature base station 100 in major transportation systems, such as trains, taxis, buses, vehicles and motorcycles, because the number of these transportations are larger than the number of the conventional base stations built in buildings, and the signals can be transmitted between one miniature base station 100 and any other miniature base stations 100 nearby, the speed of the data transmission can be increased.

It is noted that, the drawings, the embodiments, and the features and circuits in the various embodiments may be combined with each other as long as no contradiction appears. The circuits illustrated in the drawings are merely examples and simplified for the simplicity and the ease of understanding, but not meant to limit the present disclosure. In addition, those skilled in the art can understand that in various embodiments, circuit units may be implemented by different types of analog or digital circuits or by different chips having integrated circuits. Components may also be integrated in a single chip having integrated circuits. The description above is merely by examples and not meant to limit the present disclosure.

In summary, in various embodiments of the present disclosure, by reducing the size of the antenna to be suitable for high frequency and short wavelength transmission bands, more antennas can be installed in the miniature base stations, which can achieve the effect of multiple input multiple output (MIMO). And due to the small size of the antennas and miniature base stations, they can be installed in many different locations, such as vehicles, traffic poles, trash cans, and mobile phones, so as to increase the density of the base stations of the cellular network, so that the data transmission can be faster and larger.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A cellular network, comprising:
a plurality of miniature base stations, communicatively connected to each other, wherein each one of the miniature base stations has a first area and a peripheral area surrounding the first area, and each one of the miniature base stations comprises:
an antenna, arranged at the peripheral area of the miniature base stations, configured to receive and to transmit wireless signals;
a wireless signal transceiver, configured to demodulate the wireless signals received from the antenna and to modulate the wireless signals transmitted by the antenna; and
a digital signal processor, configured to process the wireless signals which are demodulated or modulated;
wherein the wireless signal transceiver and the digital signal processor are arranged in the first area, and each antenna is installed in the peripheral area of each of the miniature base stations by reducing a size of the antenna to be suitable for high frequency and short wavelength transmission bands.

2. The cellular network of claim 1, wherein each one of the miniature base stations further comprises a GPS receiver configured to receive a GPS signal and to transmit the GPS signal to a control circuit.

3. The cellular network of claim 1, wherein the antenna is suitable for a millimeter wave band from 30 GHz to 300 GHz.

4. The cellular network of claim 1, wherein the size of the antenna is within ten centimeters square.

5. The cellular network of claim 1, wherein the miniature base stations are arranged at traffic lights, electric vehicles or electric scooters.

* * * * *